W. C. HUEBNER.
ELECTROMAGNETIC CLUTCH.
APPLICATION FILED SEPT. 23, 1912.
1,056,545.
Patented Mar. 18, 1913.
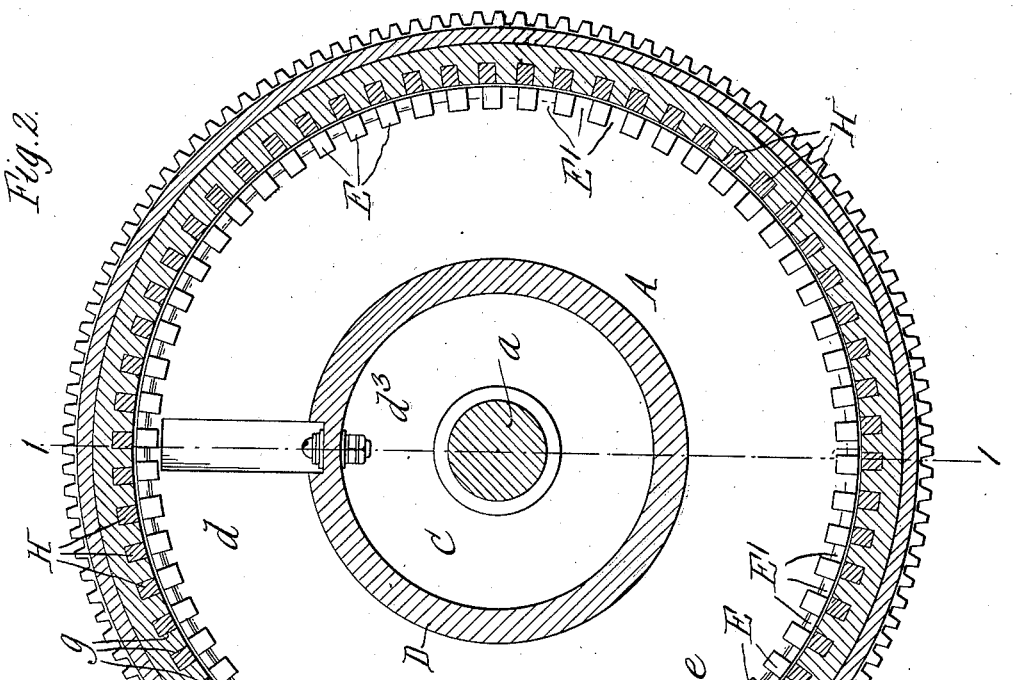
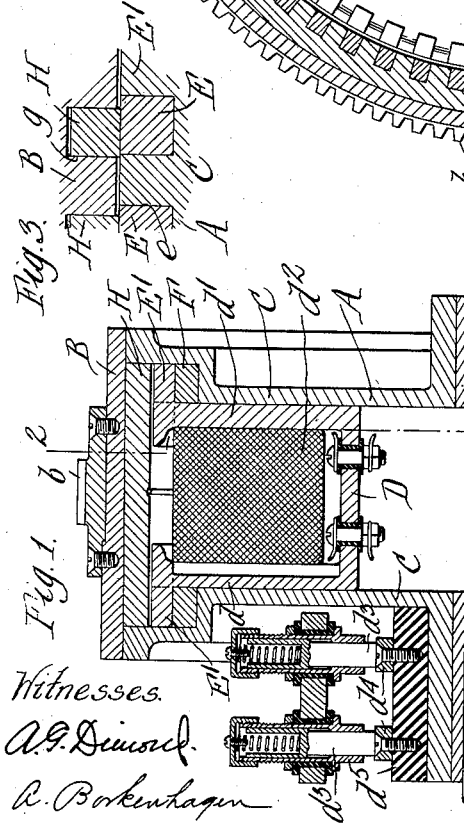
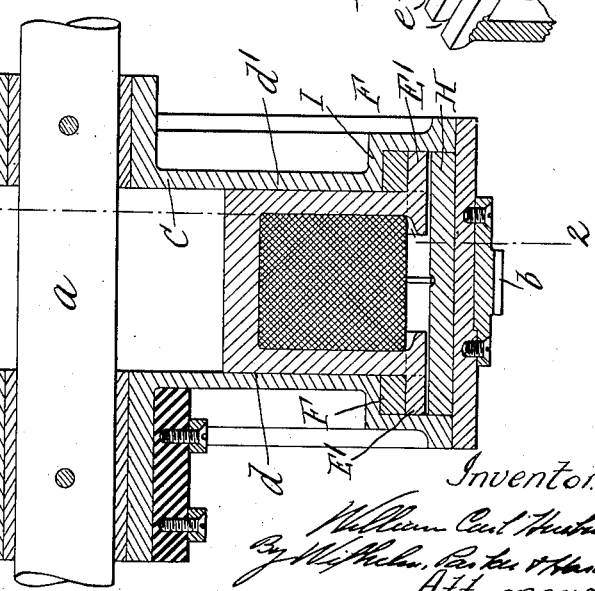

UNITED STATES PATENT OFFICE.

WILLIAM CARL HUEBNER, OF BUFFALO, NEW YORK, ASSIGNOR TO HUEBNER-BLEISTEIN PATENTS COMPANY, OF BUFFALO, NEW YORK.

ELECTROMAGNETIC CLUTCH.

1,056,545.  Specification of Letters Patent.  Patented Mar. 18, 1913.

Application filed September 23, 1912. Serial No. 721,998.

*To all whom it may concern:*

Be it known that I, WILLIAM CARL HUEBNER, a citizen of the United States, residing at Buffalo, in the county of Erie and State of New York, have invented a new and useful Improvement in Electromagnetic Clutches, of which the following is a specification.

This invention relates to electrically operated clutches for transmitting motion from a driving to a driven rotary member.

The objects of the invention are to produce a clutch of this kind in which the two members engage quickly when the clutch is energized; in which the slip of the clutch members relatively to each other is reduced to a minimum; which runs with a minimum amount of friction when the clutch is deenergized; which can be actuated by a relatively small exciting current although the clutch is powerful, efficient and thoroughly reliable; and which has other advantages as hereinafter specified.

In the accompanying drawings: Figure 1 is a longitudinal sectional elevation of a clutch embodying the invention on line 1—1, Fig. 2. Fig. 2 is a transverse sectional elevation thereof on line 2—2, Fig. 1. Fig. 3 is a fragmentary transverse section thereof, on an enlarged scale, showing the position of some of the parts when the clutch is in operation. Fig. 4 is a fragmentary perspective view thereof showing the magnetic and non-magnetic sections of the driven member separated.

Like reference characters refer to like parts in the several figures.

A represents the driven member of the clutch which is mounted on a suitable shaft $a$, and B represents the driving member which surrounds and is journaled on the peripheries of the side pieces of the driven member, and is adapted, when the two members of the clutch are uncoupled, to revolve freely about the driven member concentric therewith. The driving member B, shown, is provided with gear teeth $b$ adapted to mesh with a driving gear wheel, but this member can be fashioned so as to be driven in any other suitable way.

The driven member A, in the construction shown, consists of two side disks or plates C, preferably made of non-magnetic material, which are secured to the shaft $a$ in any suitable manner, and between which an electromagnet D is held. The electromagnet D is preferably made in the form of a spool having a hollow body with outwardly projecting end flanges $d$ $d'$. A magnetizing coil $d^2$ of any suitable kind surrounds the spool between the flanges thereof, and when energized by an electric current, causes the two flanges $d$ $d'$ of the spool to act as magnetic poles of opposite polarity. The current may be conducted to and from the coil in any suitable manner, for instance, through brushes or contacts $d^3$ $d^3$ which are connected to the terminals of an electric circuit and contact with collector rings $d^4$ $d^4$ of conducting material, secured to an insulating bushing $d^5$ on one of the disks C. The collector rings may be connected with the terminals of the coil in any suitable manner. All of these parts, except as hereinafter specified, may be of any suitable or usual construction.

The poles or flanges $d$ $d'$ of the magnet D are preferably widened or extended endwise at their peripheries in order to present an extended surface to the driving member B. These widened peripheries are provided with a plurality of longitudinally extending parallel slots or grooves $e$ which are filled with pieces E of some suitable non-magnetic material, so that the outer peripheries of the poles of the electromagnet have smooth surfaces composed of alternate magnetic and non-magnetic strips E' and E, respectively. The non-magnetic pieces E may be secured in the slots of the magnet in any suitable way, but preferably they are formed as integral teeth on rings F of brass or other suitable non-magnetic material which are secured to the flanges of the magnet spool. These rings are adapted to fit inside of the projecting peripheral portions of the spool flanges with the teeth or pieces E extending into the slots $e$ of the magnet spool D. By forming the non-conducting pieces E in this way, as integral teeth on the rings F, the work of assembling and securing the pieces in the slots of the spool is materially lessened. When the rings F are secured on the flanges of the magnet spool the outer surface of each flange is composed of alternate transverse strips of magnetic and non-magnetic material, and when the magnet is energized, the magnetic strips E' of the magnet each become independent magnets, all the strips on one flange of the magnet being of the same polarity, while all of the strips on the other flange are of the opposite polarity.

The driving member B of the clutch consists of a band or ring of non-magnetic material, which is provided on its inner face with longitudinal slots $g$ corresponding in number to the magnetic strips E' of the driven member, and in each of these slots is loosely confined a bar or armature H of soft iron or other magnetic material. These armatures extend throughout the width of the electromagnet D, across the two poles thereof and are free to move radially in the slots. Each of these armatures is so proportioned that its width circumferentially of the clutch is less than the width of the non-magnetic strips E of the magnet, so that the armatures cannot entirely bridge the gap between two adjacent magnetic strips E'. As shown, the armatures H and the slotted part of the driving member B containing them project inwardly between edge portions of the side plates C and are held from lateral displacement thereby. The plates C have shoulders I which serve to hold the non-magnetic rings F in place, and the outer edges of the plates form bearings for the driving member of the clutch.

In the operation of the clutch, when the two members are uncoupled, the armatures H will be thrown outwardly in their pockets by centrifugal force, owing to the rotation of the driving member B and will thus be held out of contact with the driven member, permitting the free rotation of the driving member. When the magnet is energized by an exciting current in the coil $d^2$ the armatures will be drawn inwardly against the magnet, each armature contacting with two alined magnetic strips E' of opposite polarity of the magnet and thereby completing a magnetic circuit between these two strips. By making the armatures H of a width less than the distance between the magnetic strips E' of the magnet, the armatures may slip on the strips until they reach a position adjacent to the edges of the strips approximately as shown in Fig. 3, but great force will be required to pull them out of contact with the strips, owing to the fact that the magnetic circuits would then have to be broken. In this manner more torque can be excited by the driven member than if the armatures bridged the gaps between the magnetic strips, which would allow them to slip from one pair of strips to the next without breaking a magnetic circuit. By this construction a much greater torque can be produced in the clutch with a given amount of current, than in clutches in which the armatures bridge the space between adjacent magnetic strips, or in which the magnetic surface is not interrupted. By providing the clutch with a large number of magnetic strips and armatures, the slip or relative movement between the driving and driven members is reduced to a minimum and the clutch will take hold promptly and be very positive in action.

The clutch is efficient and reliable in operation, can be manufactured at a small cost and has no parts that are liable to get out of order.

I claim as my invention:

1. In a clutch, the combination of a rotatable magnet having a circular periphery composed of alternate magnetic and non-magnetic portions, a member which surrounds said magnet and is rotatable relative thereto, and armatures which are carried by said surrounding member and are movable radially thereon toward and from said magnet, substantially as set forth.

2. In a clutch, the combination of a rotatable driven member comprising a magnet the poles of which have circular peripheries composed of alternate magnetic and non-magnetic portions, a rotatable driving member which surrounds said driven member, and armatures carried by said driving member which are movable inwardly and outwardly into and out of contact with the poles of said driven member, substantially as set forth.

3. In a clutch, the combination of a rotatable electromagnet comprising a magnetic core having circular end poles with alternate magnetic and non-magnetic peripheral portions, an exciting coil for said core, a rotatable member which surrounds said magnet, and armatures which are movable radially on said surrounding member toward and from said magnet core, substantially as set forth.

4. In a clutch, the combination of a driven member comprising an electromagnet consisting of a magnetic core having end flanges with alternate magnetic and non-magnetic peripheral portions, and an exciting coil surrounding said core between said flanges, a rotatable driving member surrounding said driven member and having slots in its inner surface, and armatures movable radially in said slots, substantially as set forth.

5. In a clutch, the combination of a driven member comprising an electromagnet having circular end poles provided with alternate magnetic and non-magnetic peripheral portions, a rotatable driving member surrounding said driven member, and armatures which are mounted on said driving member to move inwardly and outwardly toward and from said magnet, said armatures being of less width than the non-magnetic portions of said magnet poles, substantially as set forth.

6. In a clutch, the combination of a driven member comprising an electromagnet having circular end poles provided with peripheral slots, non-magnetic rings secured on said magnet and provided with spaced integral strips which occupy said peripheral slots in the magnet poles, a rotatable driving member surrounding said driven member, and armatures which are mounted on said driving member to move inwardly and outwardly toward and from said magnet, substantially as set forth.

Witness my hand this 18th day of September, 1912.

WILLIAM CARL HUEBNER.

Witnesses:
EDWARD WILHELM,
A. L. McGEE.